RE 24791

United States Patent Office 2,874,055
Patented Feb. 17, 1959

2,874,055
FRYING OILS

Daniel Melnick, Teaneck, N. J., and Chester M. Gooding, Staten Island, N. Y., assignors to The Best Foods, Inc., New York, N. Y., a corporation of New Jersey No Drawing. Application March 24, 1955
Serial No. 496,592

6 Claims. (Cl. 99—118)

This invention relates to a novel class of frying oils or fats suitable for the commercial frying of foods such as potato chips, cereal snacks, fish sticks and related products and to a novel frying process employing these oils and fats. These new frying oils are vegetable oils which have been selectively hydrogenated to a particular range of iodine values. The new frying oils yield fried products having the characteristics of those fried in limpid oil, without the attendant disadvantages.

According to the prior art commercial frying of food products, two classes of oils or fats have been regularly employed by industry; these are either the limpid unhydrogenated oils or the frying shortenings. The former class includes limpid unhydrogenated cottonseed, corn or soybean oil, or combinations of such vegetable oils. The iodine number (Wijs) of these oils vary from 100 to 140. The same oils after hydrogenation to iodine numbers of 60 to 70, or animal fats of lower iodine number, represent the other class of frying oils or shortenings. The latter have a melting point (Wiley) of 104° to 115° F. (40°–46° C.) and a setting or congealing point (according to the method of H. W. Vahlteich et al., U. S. Patent No. 2,047,530) of 82° to 88° F. (28°–31° C.). Factors of eating quality of the fried product and flavor stability have motivated food processors to choose one type of fat over the other. Limpid peanut oil with an iodine number of from 90 to 95 is also used as a frying oil. For reasons which will be discussed below, peanut oil has been regarded as the best of all limpid frying oils but is available in limited amounts and at much higher cost than competitive limpid oils.

When fresh products, fried commercially in limpid oils, viz., potato chips, are eaten without modification in the home, they are preferred to those fried in shortenings or animal fats. Appearance and mouthing properties are superior and the full flavor of the fried products is released. Products fried in shortenings, on the other hand, are dry in appearance, hold poorly the added salt crystals, have dry eating qualities like those of a cracker, and the flavor of the product is masked to a significant degree by the high-melting fat which coats and penetrates the product; frying fats are absorbed in high concentrations of up to 40% by weight.

Commercially fried products, viz., fish sticks, frozen during the period of retail sale and reheated prior to use, are also preferably fried in limpid oils. During freezer storage at −10° to 0° F., a frying shortening hardens on the surfaces of the fried food as a brittle opaque white coating and this objectionable appearance is maintained during the thawing-out period at room temperature. Furthermore, the individual fried units adhere strongly to each other because of the thick fat binder. When fried in limpid oils and then frozen, the products are not subject to the adverse criticisms associated with the use of shortenings.

One major disadvantage to the use of limpid unhydrogenated oils is lack of flavor stability of the resulting fried products. The limpid oils are readily susceptible to oxidative deterioration with the result that the fried products become rancid at a much earlier date than the same products fried in shortening. Peanut oil is the most stable of the limpid frying oils. This is apparent from the results shown in Table I below and obtained in the course of our research investigation of oil and fat products employed in regular commercial frying runs, wherein oil replenishment kept pace with oil removal by the product fried.

TABLE I

*Stability of prior commercial frying oils and potato chips fried in said oils*

| Frying oil | Iodine value | A. O. M. stability,[1] hours | Flavor-life of potato chips [2] at 95° F., weeks |
|---|---|---|---|
| Limpid soybean oil | 132 | 8 | 1 |
| Limpid corn oil | 122 | 10 | 1.5 |
| Limpid cottonseed oil | 109 | 12 | 2 |
| Limpid peanut oil | 93 | 24 | 3 |
| Soybean oil shortening | 67 | 210 | 10 |
| Cottonseed oil shortening | 61 | 90 | 12 |

[1] Active Oxygen Method of King et al., "Oil and Soap," vol. 10, page 105 (1933), modified by Riemenschneider et al., "Oil and Soap," vol. 20, page 169 (1943). This method involves aeration of the oils and fats at 98° C. (208.5° F.) under standardized conditions until an organoleptically detected rancidity develops; this is associated with a peroxide value of 120 milliequivalents per kilogram of fat in the case of the limpid frying oils and 100 milliequivalents in the case of the shortenings.
[2] Objective flavor scorings conducted serially by a panel of ten judges, until a score of below "fair" was obtained. Products obtained after the frying oils were in an equilibrium state, i. e., when the ratio of fresh to heated oil in the frying vat is essentially constant as oil replenishment keeps pace with oil absorption by the product being fried.

As will be seen from Table I, the limpid vegetable oils and potato chips fried in them are characterized by low stability, whereas the shortenings and potato chips produced from them have significantly superior stability.

For the tests summarized in Table I above, a Macbeth fryer was employed. It held 1,750 pounds of oil and produced 250 pounds of fried potato chips per hour. Oil replenishment was at the rate of 96 pounds per hour. Two varieties of potatoes, namely, Irish Cobblers and Kennibecs, were used in these tests. The potatoes were peeled in an abrasive-type machine, conveyed to a slicing machine, and the slices washed by alternate baths and sprays of water. The slices were dried by air blast and then conveyed to the oil-fired, steel Macbeth fryer. Oil temperature at the inlet was 350° F. Frying time varied from 2.5 to 3.0 minutes. Exit oil temperature was 385° F. The chips drained free of excess oil were salted during passage under a hopper-type, slotted rotary drum salter. At the end of each day's operation, the hot oil was pumped from the fryer through a small filter press into a reservoir tank. The reservoir automatically supplied oil to the fryer during the daytime operations to keep the level of the oil in the fryer constant (±0.1 inch) and replace oil removed by the finished potato chips.

The prior art has attempted to blend shortenings with limpid frying oils to obtain flavor stability of the fried product intermediate between that noted when these types of fats are employed individually. In other words, the goal has been to obtain the appearance and eating quality of products fried in limpid oil, and the flavor stability of products fried in shortening. Neither one of the two objectives has been realized. When the shortening component amounts to more than 50 percent of the blend, appearance and eating quality of the fried foods are impaired. When the shortening component is less than 50 percent of the blend, flavor stability of the fried products is practically no better than that noted when limpid vegetable oil is employed, viz., at most a one week's extension of the flavor life of potato chips stored at 95° F. Despite such disappointing results, there is a widespread practice among commercial fryers to add shortening to limpid frying oil during the hot summer months in an attempt to improve the stability during this critical period of shelf life.

The food frying industry has also attempted to add antioxidants, singly and in combinations, to permit the use of limpid unhydrogenated frying oils without sacrificing shelf life of the fried products. These additives include the true phenolic-type antioxidants, such as propyl gallate and butylated hydroxyanisole, and the metal-sequestering acid synergists, such as citric acid. These additives have limited stability at the high temperatures of frying (385° F.) with the result that the flavor life of the fried product is extended to only a small degree; at most by only 50 per cent.

A second major disadvantage to the use of limpid unhydrogenated oils for frying foods is the susceptibility of these oils to thermal polymerization. Only the polyunsaturated fatty acids in the oils participate in thermal polymerization reactions. The oils of higher iodine number contain more of these polyunsaturated fatty acids than do oils of lower iodine value. Thus, unhydrogenated soybean oil contains up to 65 percent of linoleic plus linolenic acids (55%+10%), while peanut oil contains up to 25 percent of linoleic acid. The values for corn and cottonseed oils are in between these two with about 45-55 percent linoleic acid and, as in the case of peanut oil, no linolenic acid. Frying shortenings contain no linolenic acid and very little linoleic acid, i. e., well under 8 percent.

When oils containing polyunsaturated fatty acids are heated for extended periods of time at high temperatures, polymers are formed. The cyclized or branched monomers and the dimers are definitely toxic and should be avoided. As thermal polymerization proceeds, there is a progressive reduction in the iodine number of the oil, since new C-C crosslinkages occur at the expense of the double bonds in the molecules involved. When food products are fried in limpid unhydrogenated vegetable-seed oils even with continuous addition of oil to the vat to compensate for that absorbed, the iodine value of the oil becomes progressively smaller, viz., a drop in iodine number of up to 20 may occur. Eventually the residual oil must be discarded, and the operation begun again with completely fresh oil. The discarded oil cannot be salvaged since refining and deodorization will not eliminate the thermal polymers from the oils. Antioxidants which protect polyunsaturated fatty acids against oxidation cannot prevent them from participating in thermal polymerization reactions, since the latter also take place in an inert non-oxidizing atmosphere. The frying shortenings exhibit no decrease in iodine value on continued use and therefore are free from thermal polymers.

It is an object of the present invention to provide frying oils which possess the desirable attributes of both limpid unhydrogenated vegetable-seed oils and of hydrogenated frying shortenings without the disadvantages associated with the use of each class of oil.

It is another object of the present invention to provide fried foods characterized by (a) having the appearance and eating quality of foods fried in limpid unhydrogenated oils, (b) having the flavor stability characteristic of foods fried in hydrogenated shortenings, and (c) being free of undesirable thermal polymers.

Additional objects will be apparent to those skilled in the art from the specification which follows.

The novel frying oils of the present invention are deodorized, selectively hydrogenated, vegetable-seed oils having an iodine value of from 75 to 94, a melting point of from 80° to 95° F., and a setting point of from 55° to 65° F. The source of the oil influences the ranges of constants somewhat. Thus, the values for frying fats produced from the more unsaturated vegetable oils, i. e., having an iodine value of 120 and above, such as soybean and corn oils, after selective hydrogenation are preferably 82 to 94 for iodine value, 82° to 92° F. for melting point, and 55° to 65° F. for setting point. For frying fats produced from the more saturated vegetable oils, i. e., having an iodine value of less than 120, such as cottonseed and peanut oils, the ranges of values are preferably 75 to 92 for iodine value, 85° to 95° F. for melting point, and 55° to 65° F. for setting point. This range of setting point values is the common denominator for all the new frying oils of the invention.

The established methods for the determination of the setting (congealing) point of hydrogenated oils are not applicable to the new frying oils. As employed in describing the frying oils of this invention this value is determined by first pre-chilling the oil to 55.5° F. in a 32°–41° F. water bath and then transferring it to a 32°–41° F. air bath. The oil is then subjected to slow uniform agitation until the temperature of the oil ceases to fall and comes to rest. The maximal temperature resulting from the dissipation of titer heat is then recorded as the setting point. Likewise a procedure for determining setting point of the conventional limpid frying oils had to be developed in order to differentiate more clearly these oils of the prior art from those of the present invention. The procedure calls for the pre-chilling of the limpid oils to 5° to −5° F. in an acetone-solid carbon dioxide bath with slow uniform agitation until the first turbidity develops, transference of the tube containing the oil to an air bath at 5° to −5° F. and recording the highest temperature as the setting point. In determining the melting points of these same limpid frying oils, the Wiley method also had to be modified. The oil is cast as a solid disc on solid carbon dioxide, and the disc added to a melting point tube containing a 50:50 glycerine to water solution as the bottom layer and isopropanol as the top layer. The temperature of the acetone-solid carbon dioxide bath is gradually raised by adding more acetone, the latter being at about 75° F. The same endpoint in the standard Wiley procedure, the temperature at which the disc at the interphase becomes an elastic sphere, is recorded as the melting point.

The new frying oils of the present invention are further characterized by a reduction in linoleic acid content of from 50% to 90% of the content of the original unhydrogenated oil, but without any significant increase in saturated fatty acid content as determined by the method of test to be discussed below. Thus, in the case of the new frying oils prepared by selectively hydrogenating oils originally having a linoleic acid content of about 50%, such as cottonseed oil, the linoleic acid content varies from 15% to 25% (a reduction of from about 50% to 70%) and the saturated fatty acid content is no greater than that of the original unhydrogenated oil (not more than 25%). Also in the case of the new frying oils prepared from unhydrogenated oils having a polyunsaturated fatty acid content of above 50%, such as soybean oil, the saturated fatty acid content is not increased despite a 70% to 90% reduction in linoleic acid conent (to 5% to 15%) and a 90% to 100% reduction in linolenic acid content (to not more than 1%).

The present invention finds its greatest applicability in producing those selectively hydrogenated vegetable-seed oils which originally possessed a high linoleic acid content, i. e., a linoleic acid content in excess of 30%. Examples of vegetable oils having such an initial linoleic acid content are: corn, cottonseed, soybean, poppyseed, sesame, sunflower, rice-bran, etc.

Examples of the new class of frying oils of this invention are given in Table II below. For the purpose of comparison, the properties of fatty acid composition of the oils and shortenings used by the frying industries in accordance with the teachings of the prior art are also listed in Table II. Table II follows:

TABLE II

*Novel frying oils of the present invention in reference to frying oils used by the prior art*

| Example | Class [1] | Iodine value | M. P., °F. | S. P., °F. | Fatty acid content | | | | A.O.M. value,[2] hours |
|---|---|---|---|---|---|---|---|---|---|
| | | | | | Linolenic, percent | Linoleic, percent | Oleic, percent | Saturated, percent | |
| Ref. A | Limpid unhydrogenated CSO | 109.0 | 57.0 | 30.2 | 0.0 | 49.6 | 21.3 | 24.7 | 12 |
| Ref. B | Frying CSO shortening | 60.6 | 103.3 | 84.4 | 0.0 | 2.1 | 63.1 | 30.4 | 90 |
| Ref. C | ----do---- | 59.4 | 109.0 | 86.9 | 0.0 | 6.8 | 52.5 | 36.3 | 60 |
| 1 | Novel frying CSO | 84.9 | 90.7 | 59.5 | 0.0 | 18.6 | 57.0 | 20.0 | 30 |
| 2 | ----do---- | 81.2 | 92.0 | 63.0 | 0.0 | 15.8 | 58.5 | 21.3 | 38 |
| 3 | ----do---- | 91.0 | 88.3 | 56.3 | 0.0 | 25.2 | 50.8 | 19.6 | 26 |
| 4 | ----do---- | 85.4 | 91.8 | 63.0 | 0.0 | 18.9 | 57.0 | 19.7 | 34 |
| Ref. D | Limpid unhydrogenated SBO | 132.2 | 24.0 | 11.3 | 6.8 | 52.6 | 23.8 | 12.4 | 8 |
| Ref. E | Frying SBO shortening | 67.2 | 106.9 | 89.4 | 0.0 | 0.0 | 74.8 | 20.8 | 210 |
| Ref. F | ----do---- | 69.5 | 114.3 | 84.6 | 0.0 | 4.3 | 68.6 | 22.7 | 120 |
| 5 | Novel frying SBO | 88.5 | 85.5 | 58.5 | 0.5 | 10.4 | 76.0 | 8.7 | 60 |
| 6 | ----do---- | 86.0 | 91.0 | 59.2 | 0.2 | 8.9 | 77.1 | 9.4 | 75 |
| 7 | ----do---- | 89.8 | 83.5 | 56.7 | 0.5 | 12.1 | 74.0 | 9.0 | 57 |
| 8 | ----do---- | 83.3 | 83.3 | 59.5 | 0.1 | 6.4 | 79.5 | 9.6 | 92 |
| Ref. G | Limpid unhydrogenated CO | 122.3 | 27.0 | 12.2 | 0.0 | 51.4 | 32.6 | 11.6 | 10 |
| 9 | Novel Frying CO | 87.2 | 87.8 | 59.1 | 0.0 | 12.1 | 72.7 | 10.8 | 51 |
| Ref. H | Limpid unhydrogenated PNO | 93.4 | 59.0 | 37.8 | 0.0 | 25.1 | 53.5 | 17.0 | 24 |
| 10 | Novel frying PNO | 76.4 | 86.6 | 58.0 | 0.0 | 7.8 | 69.4 | 18.4 | 56 |

[1] CSO=cottonseed oil; SBO=soybean oil; CO=corn oil; PNO=peanut oil.
[2] As defined in Table I.

Reference oils A, D, G and H shown in Table II above are the limpid vegetable-seed oils comployed in accordance with prior art practices by those who prefer to make fried products more acceptable in appearance and eating quality even though their use requires a sacrifice in resistance to thermal polymerization and in flavor stability of the fried products. Reference oils B and E are the shortenings obtained following selective hydrogenation of the limpid oils, while reference oils C and F are those shortenings obtained following nonselective hydrogenation of the limpid oils. The latter method of hydrogenation gives products of higher linoleic acid content, reduced oleic acid content, and higher saturated fatty acid content, and of lower stability than that which obtains following selective hydrogenation.

The new class of frying oils of the present invention, including the oils of Examples 1 through 10 of Table II, is produced by selectively hydrogenating limpid vegetable oils to particular ranges of critical values. In the hydrogenation of vegetable oils in making a frying shortening, there occurs not only a step-wise conversion of the more highly unsaturated or polyunsaturated fatty acids to the mono-saturated fatty acids, but in the course of this addition of hydrogen at the double bonds there are formed in appreciable concentrations fatty acid isomers with physical and chemical properties different from the naturally-occurring unsaturated fatty acid. Conditions of hydrogenation will determine in large measure the relative quantities of the fatty acid isomers in a fat. Under selective conditions of hydrogenation there occurs preferential hydrogenation of the fatty acids containing active methylene groups (linoleic) in preference to acids devoid of such groups (oleic). It therefore follows that in selective hydrogenations, with greater opportunities provided for the preferential hydrogenation of the polyunsaturated fatty acids, there occurs to a greater degree the development of fatty acid isomers and to a much lesser degree the development of saturated fatty acids.

There are several conditions which have a bearing upon whether the hydrogenation shall be non-selective or selective in character, and those skilled in the art are familiar with them. In general it may be said that the lower the pressure conditions, the higher the temperature, the lesser the agitation and the more active the catalyst, the more selective the character of the hydrogenation is likely to be. While each of these factors, as well as others with which those skilled in the art are familiar, plays a part in determining the character of the hydrogenation, the condition which plays the role of primary importance in controlling the type or character of the hydrogenation is temperature. The other conditions, such as pressure, agitation and catalyst activity, are of much lesser importance. We have observed that, generally speaking, a temperature of 260° F. may be said to be the dividing point between selective and non-selective conditions. More specifically, at hydrogenation temperatures below 250° F. the hydrogenation is likely to be non-selective in character, while at temperatures above 260° F. the hydrogenation is likely to be selective. Naturally, the lower the temperature, the more non-selective will be the hydrogenation; while the higher the temperature, the more selective it will be. We contemplate employing hydrogenation temperatures in excess of 250° F. and preferably between 300° and 350° F.

Demonstrating the process according to the present invention of selective hydrogenation of limpid vegetable oils are the examples below. These examples are merely illustrative of the process and other conditions which are equivalent to those shown may be employed. To provide a better comparison between oils, the selective hydrogenation conditions were substantially identical in each case.

EXAMPLES

In each of Examples 1 through 10 of Table II above, limpid vegetable oils, which had been alkali-refined, were employed as the starting materials. In the case of Examples 1–4 the starting material was the limpid unhydrogenated cottonseed oil of Reference A. Examples 5–8 employed the limpid unhydrogenated soybean oil of Reference D. Examples 9 and 10 employed the limpid unhydrogenated oils of References G and H, respectively. Each of the limpid unhydrogenated starting oils was pumped in a quantity of 20,000 pounds into separate hydrogenation vessels. About 0.1% (based upon nickel content of the catalyst) of a nickel catalyst known as Rufert's catalyst (described in U. S. Patent No. 2,424,811) was added to each oil. The temperature of the mixture was raised in each case to between about 270° F. and 300° F. and upon subjecting each reaction mixture to hydrogen gas at a pressure maintained at about 20 pounds per square inch, the temperature was increased to 300°–350° F. The hydrogenation was permitted to continue with agitation of the reaction mixture until the setting point, melting point and iodine value in each case corresponded to those listed for the appropriate example in Table II above. The resulting hydrogenated oils were then filtered to remove the catalyst and finally deodorized by the usual high-vacuum steam treatment.

In Table II above the fatty acid contents of the oils were determined as follows: Polyunsaturated fatty acid composition was determined according to the spectrophotometric method of Brice and associates, "Oil and Soap," vol. 22, page 219 (1945). Oleic acid content was based upon the iodine value of the oil after correcting for the polyunsaturated fatty acids present, and saturated fatty acid content was calculated by difference (Beadle, "Oil and Soap," vol. 23, page 140 (1946)). This method, when applied to hydrogenated oils, tends to overestimate oleic acid content and underestimate saturated fatty acid content. During hydrogenation, the middle double bond in linolenic acid may be hydrogenated and migration of double bonds may also occur. Isomers can be so formed which do not respond to the spectrophotometric method for the polyunsaturated fatty acids, i. e., polyunsaturated fatty acids (isolinoleic acids) are produced with double bonds so far removed that conjugation cannot be effected by the alkali treatment prior to spectrophotometric measurement. Such linoleic acid isomers react like twice the quantity of oleic acid in the determination of iodine value. These then are responsible for the overestimation of oleic acid content and, since saturated fatty acid content is calculated by difference, for the underestimation of the latter. However, the spectrophotometric method, as employed here, is sufficiently accurate and reproducible to permit us to define with reasonable precision the fatty acids distribution of the frying oils of the present invention.

In Table III below are presented data showing that the blending operations of the prior art and as practiced in the frying industries, whereby a limpid unhydrogenated oil is mixed with a frying shortening, are inadequate to match the performance of the novel frying oils of this invention. A 50:50 blend of limpid cottonseed oil with a cottonseed oil shortening (obtained by selective or by non-selective hydrogenation) yields an oil with an iodine number falling in the middle of the range of iodine values for the new cottonseed frying oils of the present invention. But from this point on, similarity between the blends and our novel frying oils ceases. The blends of the prior art have much higher melting points, very much higher setting points, and much more linoleic and saturated fatty acid contents. In resistance to oxidative deterioration the blends are very much inferior to the novel frying oils of the present invention. The same pattern is apparent when the source of oils is soybeans. Decreasing the ratio of limpid oil to frying shortening to improve the stability of the oil blends is no solution to the problem since the blends then take on more and more the undesirable physical properties of a shortening. As the blends are formulated, they are already undesirable in this respect. Table III follows:

TABLE III

*Failure of blends of the frying oils of the prior art to duplicate the new class of frying oils of the present invention*

| Frying oil [1] | Iodine value | M. P., °F. | S. P., °F. | Fatty acid content | | | | A. O. M.[2] value, hours |
|---|---|---|---|---|---|---|---|---|
| | | | | Linolenic, percent | Linoleic, percent | Oleic, percent | Saturated, percent | |
| 50:50 blend of limpid CSO and CSO shortening (refs. A+B of Table II) | 84.9 | 98.7 | 74.0 | 0.0 | 26.2 | 41.8 | 27.4 | 16 |
| 50:50 blend of limpid CSO and CSO shortening (refs. A+C of Table II) | 84.5 | 100.2 | 75.8 | 0.0 | 28.2 | 37.3 | 30.1 | 15 |
| New frying CSO of the present invention | 80–92 | 85–95 | 55–65 | 0.0 | 15–25 | 50–60 | 19–22 | 25–40 |
| 33:67 blend of limpid SBO and SBO shortening (refs. D+E of Table II) | 88.9 | 100.6 | 80.0 | 2.2 | 17.3 | 57.5 | 18.6 | 24 |
| 33:67 blend of limpid SBO and SBO shortening (refs. D+F of Table II) | 89.9 | 102.0 | 76.4 | 2.2 | 20.2 | 52.7 | 20.5 | 20 |
| New frying SBO of the present invention | 82–94 | 82–92 | 55–65 | 0–1 | 5–15 | 70–80 | 8–12 | 50–100 |

[1] CSO=cottonseed oil; SBO=soybean oil.
[2] As defined in Table I.

In Table IV below are tabulated the organoleptic qualities and stability of potato chips fried in the oils of the present invention and in blends of oils of the two classes as employed by the prior art. It will be noted that chips fried in the oils blends take on all the undesirable properties (appearance and eating qualities) of chips fried in shortenings and the undesirable lack of stability of chips fried in limpid unhydrogenated oils (compare results with those in Table I above). On the other hand, chips fried in our novel frying oils have all the desirable properties without disadvantages of chips that had been fried in each class of oil. The potato chips compared in Table IV were fried in accordance with the procedure described above in connection with Table I, except that the frying oils were those listed in the table. Table IV follows:

TABLE IV

*Organoleptic qualities and stability of potato chips fried in the oils of the present invention and in blends of oils of the two classes as employed by the prior art*

| Frying oil [1] | Iodine value | Properties of the potato chips | |
|---|---|---|---|
| | | Appearance and eating qualities | Flavor-life [2] at 95° F., weeks |
| Example 1, new frying CSO (see Table II) | 84.9 | Liquid oil film on surface, good salt adherence, good mouthing properties, full flavor release. | 8 |
| 50:50 blend of limpid CSO and CSO shortening (Refs. A+B of Table II) | 84.9 | Dry in appearance, poor salt adherence, dry mouthing properties, flavor muffed. | 3 |
| Example 5, new frying SBO (see Table II) | 88.5 | Liquid oil film on surface, good salt adherence, good mouthing properties, full flavor release. | 7 |
| 33:67 blend of limpid SBO and SBO shortening (Refs. D+E of Table II) | 88.9 | Dry in appearance, poor salt adherence, dry mouthing properties, flavor muffed. | 1.5 |

[1] CSO=cottonseed oil; SBO=soybean oil.
[2] Objective flavor scorings conducted serially by a panel of 10 judges, until a score of "fair" was obtained. Products obtained after the frying oil had attained an equilibrium state.

During the course of our investigation, the resistance to thermal polymerization of the novel frying oils of the present invention was determined. Since the commercial frying of potato chips was found to produce only a minimum of free fatty acids, another system which produces larger amounts of free fatty acids was employed for the tests. It was found that in the commercial frying of breaded fish sticks or French-fried potatoes there is a progressive increase in free fatty acid content with continuous frying until values as high as 10.0% are sometimes obtained. Consequently, it was decided to conduct our studies by frying breaded fish sticks as the test system to follow thermal polymerization changes.

The frying system used for these thermal polymerization rate studies contained 3,250 pounds of oil which was maintained at a temperature of about 385° to 390° F. The level in the fryer was maintained constant by continuously feeding in fresh oil, about 260 pounds per hour, to replenish that absorbed by the fried fish sticks, which were fried for about 50 seconds. The oil in part was passed during the continuous operation through a filter, containing filter aid plus fuller's earth, to remove fine bread crumbs. For reasons mentioned hereinabove a drop in iodine value was considered as an indication of the extent of thermal polymerization changes. The results of this study comparing a novel cottonseed oil frying fat according to the present invention with an unhydrogenated limpid corn oil are summarized in Table V. Table V follows:

TABLE V

*Thermal polymerization of prior art frying oils and the novel frying oils of the present invention in frying of breaded fish sticks*

| Frying time, hours | Unhydrogenated limpid corn frying oil | | Cottonseed frying oil according to the present invention | |
|---|---|---|---|---|
| | Free fatty acids, percent | Iodine value | Free fatty acids, percent | Iodine value |
| 0 | 0.04 | 122.3 | 0.04 | 82.1 |
| 15 | 0.94 | 118.4 | 0.73 | 81.1 |
| 30 | 1.58 | 116.1 | 1.22 | 81.4 |
| 45 | 1.99 | 113.5 | 1.54 | 80.2 |
| 80 | 3.33 | 110.4 | 2.59 | 82.6 |
| 95 | 3.97 | 109.1 | 2.82 | 81.0 |
| 125 | 4.45 | 106.8 | 3.38 | 82.3 |
| 160 | 4.77 | 105.1 | 3.44 | 82.0 |
| 180 | 4.94 | 104.4 | 3.33 | 83.1 |
| 225 | 5.05 | 103.2 | 3.61 | 82.8 |

From the data presented in Table V above we have concluded that free fatty acid development in the novel frying oils of the present invention occurs at a slower rate than when limpid unhydrogenated corn oil is employed. This in itself is a surprising development. The most important finding, however, is that no thermal polymerization changes occur when the novel frying oils of this invention are employed, whereas with limpid unhydrogenated corn oil such changes do occur (progressive decrease in iodine value). The novel frying cottonseed oil used in this particular study originally contained 16.8% linoleic acid, while the limpid unhydrogenated corn oil contained at the start 51.4% linoleic acid. One would then expect thermal polymerization to occur in this oil also but to about one-third the degree, i. e., a decrease of about 6 to 7 in iodine value after the 225 hours of frying. Such did not occur. It now appears from our results that thermal polymerization changes in a frying oil are dependent upon a particular minimal concentration of polyunsaturated fatty acids in the oil and the possibility of such undesirable changes occurring increases at a geometric rate as the concentration of polyunsaturated fatty acids in the oil increases.

The novel frying oils of this invention may be oils from one source, viz., cottonseed or soybean, selectively hydrogenated to within the limits set forth above, or blends of oils from two or more sources selectively hydrogenated to within the prescribed limits, or blends of the new frying oils themselves.

Antioxidants of the phenolic type (such as butylated hydroxyanisole) with or without acid synergists (such as citric acid or mono-esters of citric acid in accordance with U. S. Patent No. 2,485,632 of H. W. Vahlteich et al.) may also be added to the new frying oils for increasing the flavor life of both the novel frying oils and the products fried therein.

As employed herein, and in the appended claims, the terms "frying oil" and "vegetable-seed oil" are intended to include any vegetable fat which has an iodine value, melting point and seting point within the ranges specified for the oils of the present invention.

The terms and expressions which we have employed are used as terms of description and not of limitation and we have no intention, in the use of such terms and expressions, of excluding any equivalents of the features shown and described or portions thereof, but recognize that various modifications are possible within the scope of the invention claimed.

What is claimed is:

1. A novel frying oil comprising a deodorized, hydrogenated vegetable-seed oil having an iodine value of from 75 to 94, a melting point of from 80° to 95° F., and a setting point of from 55° to 65° F.

2. A novel frying oil comprising a deodorized, hydrogenated vegetable-seed oil having an iodine value of from 82 to 94, a melting point of from 82° to 92° F., and a setting point of from 55° to 65° F., and having a polyunsaturated acid content which has been reduced from 50% to 90% of that of the original unhydrogented oil from which it is produced but having no greater saturated fatty acid content than the original oil.

3. A novel frying oil comprising a deodorized, hydrogenated vegetable-seed oil having an iodine value of from 75 to 92, a melting point of from 85° to 95° F., and a setting point of from 55° to 65° F., and having a polyunsaturated acid content which has been reduced from 50% to 90% of that of the original unhydrogenated oil from which it is produced but having no greater saturated fatty acid content than the original oil.

4. A novel frying oil comprising a deodorized, hydrogenated cottonseed oil having an iodine value of from 80 to 92, a melting point of from 85° to 95° F., a setting point of from 55° to 65° F., a linoleic acid content of from 15% to 25%, and a saturated fatty acid content of not more than about 25%.

5. A novel frying oil comprising a deodorized, hydrogenated soybean oil having an iodine value of from 82 to 94, a melting point of from 82° to 92° F., a setting point of from 55° to 65° F., a linolenic acid content of not more than 1%, a linoleic acid content of from 5% to 15%, and a saturated fatty acid content of not more than about 13%.

6. A frying oil comprising a deodorized hydrogenated vegetable seed oil having an iodine value of about 76.4 to 88.5, a melting point of about 83.3 to 92.0° F., a setting point of about 58 to 63° F., a linoleic acid content of about 6.4 to 18.9%, an oleic acid content of about 57.0 to 79.5%, and a saturated acid content of about 8.7 to 21.3%.

References Cited in the file of this patent

UNITED STATES PATENTS

| | | |
|---|---|---|
| 1,135,351 | Burchenal | Apr. 13, 1915 |
| 1,187,999 | Lowenstein | June 20, 1916 |
| 1,483,155 | Boyce | Feb. 12, 1924 |
| 2,047,530 | Vahlteich et al. | July 14, 1936 |
| 2,123,342 | Paterson | July 12, 1938 |
| 2,125,215 | Barbour | July 26, 1938 |

(Other references on following page)

UNITED STATES PATENTS

| | | |
|---|---|---|
| 2,127,716 | Brucke | Aug. 23, 1938 |
| 2,136,653 | Moore et al. | Nov. 15, 1938 |
| 2,163,603 | Jenness | June 27, 1939 |
| 2,164,291 | Jenness | June 27, 1939 |
| 2,167,113 | Haurand | July 25, 1939 |
| 2,207,316 | Ferry | July 9, 1940 |
| 2,212,461 | Swartz | Aug. 20, 1940 |
| 2,293,729 | Gudheim | Aug. 25, 1942 |
| 2,448,152 | Patton | Aug. 31, 1948 |
| 2,520,440 | Sanders | Aug. 29, 1950 |
| 2,589,097 | Lange | Mar. 1, 1952 |

OTHER REFERENCES

Bailey, A. E.: "Cottonseed and Cottonseed Products," Interscience Publishers, Inc., New York (1948), page 398.